United States Patent [19]

Baluteau et al.

[11] Patent Number: 4,637,692
[45] Date of Patent: Jan. 20, 1987

[54] OBSERVATION APPARATUS

[75] Inventors: Jean-Michel Baluteau, Livry-Gargan; Michel Saint-Sevin, Gagny; Patrick Chabanier, Vincennes, all of France

[73] Assignee: Societe d'Optique, Precision Electronique et Mecanique-Sopelem, Levallois-Perret, France

[21] Appl. No.: 607,488

[22] Filed: May 7, 1984

[30] Foreign Application Priority Data

May 11, 1983 [FR] France ............................. 83 07936

[51] Int. Cl.[4] ............................................. G02B 26/08
[52] U.S. Cl. ..................................................... 350/486
[58] Field of Search ................... 350/6.4, 6.5, 6.9, 445, 350/575, 632; 352/93, 94; 354/150, 109

[56] References Cited

U.S. PATENT DOCUMENTS 2,518,347 8/1950 Mandel ................................. 354/150
3,140,341 7/1964 Holt ....................................... 352/94

Primary Examiner—John K. Corbin
Assistant Examiner—Vincent J. Lemmo
Attorney, Agent, or Firm—Pollock, Vande Sande & Priddy

[57] ABSTRACT

An observation apparatus enabling alternative sighting of two objects (11, 21) placed in two intersection planes (1, 2). The apparatus comprises, in front of its objective lens (42), a reflector (6) comprising a single flat reflecting surface capable of pivoting around the optical axis (41) of the objective, this axis being positioned substantially in the bisector plane (5) or a plane parallel to the bisector plane of the dihedron formed by the two object planes (1, 2) while forming a specified angle with a ridge (3) of the dihedron. The apparatus applies particularly to an audiovisual device for sighting, using a camera, a person or a document placed before him or her so as to be readable in a normal fashion.

5 Claims, 2 Drawing Figures

OBSERVATION APPARATUS

FIELD OF THE INVENTION

The present invention relates to an observation apparatus making it possible to aim alternately in at least two directions.

This apparatus applies particularly to an audiovisual device in which it is possible to sight, using a camera, either a person or a document placed before the said person so that it can be read normally by that person.

PRIOR ART

When it is desired to sight alternately, with an instrument such as a camera, two objects, for example a person and a document which is to be read normally by that person, it is possible to cause the camera to execute two different movements in order to preserve good positioning of the images. However, this solution is complicated and costly.

SUMMARY OF THE INVENTION

The present invention is aimed at providing an apparatus equipped with a viewfinding or observation instrument kept motionless and making it possible to sight alternately two objects belonging to two intersecting planes, giving two images thereof positioned in the same direction in such a way that it is unnecessary to rotate one image relative to the other. This device is simple and inexpensive.

The apparatus according to the invention incorporates a viewfinding or observation instrument equipped with an objective lens and is intended for sighting two objects placed in two intersecting planes. Its essential feature is that it comprises, in front of the said objective, a reflector comprising a single flat reflecting surface capable of pivoting around the axis of the objective, this objective axis being positioned substantially in the bisector plane of the dihedron formed by the two object planes while forming a specified angle with the ridge of the dihedron.

According to a feature of the invention, if $\alpha$ designates the angle of the dihedron, the axis of the objective forms an angle substantially equal to $(\pi - \alpha/2)$ with a straight line normal to the ridge in the bisector plane.

According to another feature of the invention, the angle of incidence of the optical axis on the reflecting surface of the reflector is substantially defined by the relationship $$\cos 2i = \pm \sin^2 \frac{\alpha}{2}.$$

According to yet another feature of the invention, the apparatus incorporates means for rotating the reflector between two observation positions which are such that the angle $\gamma$ of rotation of the reflector from the one to the other is substantially defined by $$\tan \frac{\gamma}{2} = \frac{\lambda}{\sin \frac{\alpha}{2}}.$$

BRIEF DESCRIPTION OF THE DRAWINGS

The invention will now be described in greater detail with reference to an embodiment given by way of example and shown in the attached drawings, in which.

DETAILED DESCRIPTION

Figure 1:
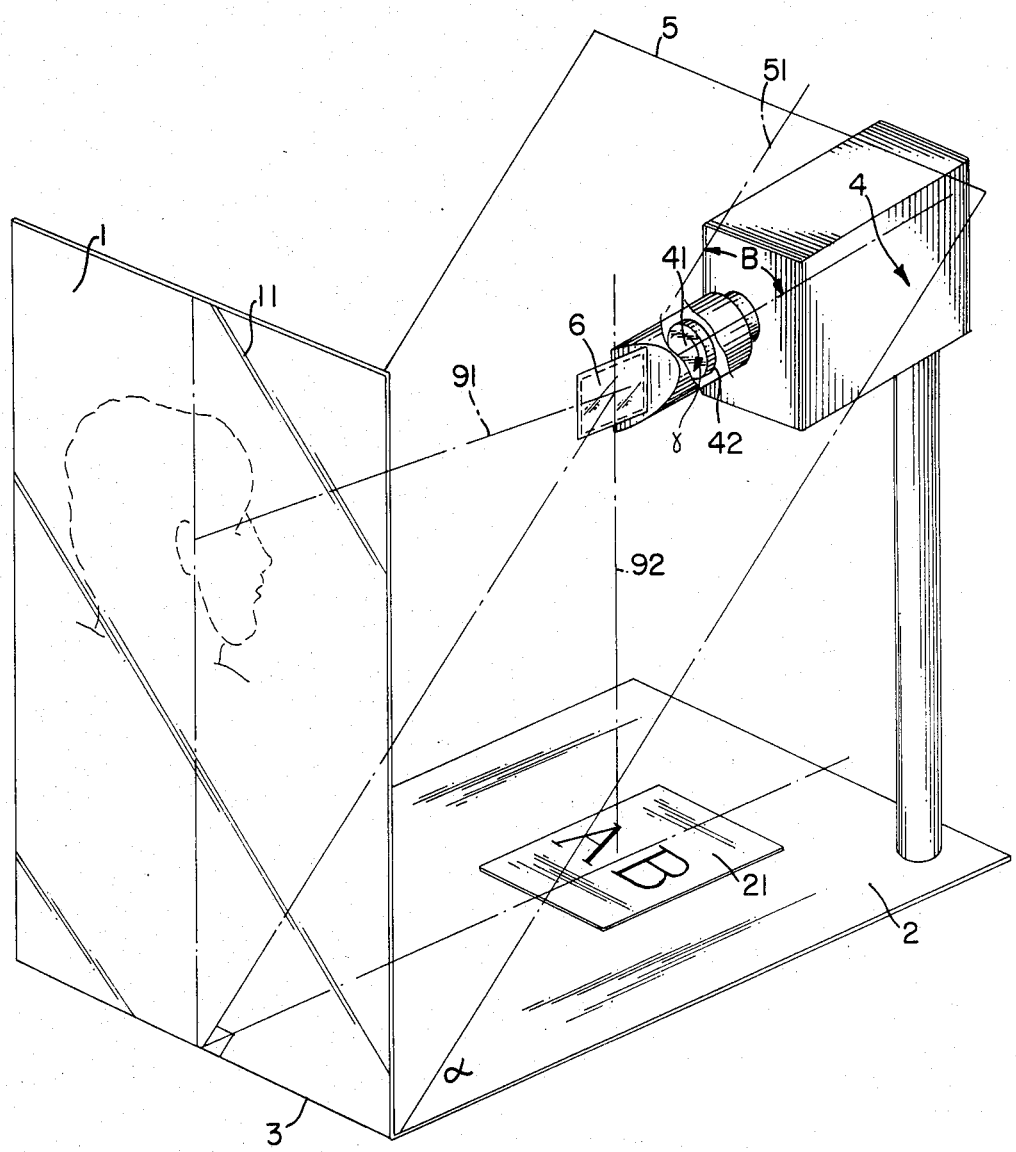
FIG. 1 is a diagram of the device according to the invention.

The apparatus shown in FIG. 1 makes it possible to sight two objects 11 and 21. It incorporates an observation (or view finding) instrument 4 as such and a reflector 6 (prism or mirror) placed in front of the objective and capable of rotating around the axis (41) of the latter. The reflector 6 is mounted on the instrument 4 by means of a mechanism which ensures the guidance in rotation. The instrument 4 is held in a fixed position by a support.

The two objects 11 and 21 will be deemed to be contained respectively in imaginary half-planes 1 and 2 which intersect along a ridge 3, the dihedral angle being designated $\alpha$.

Figure 2:
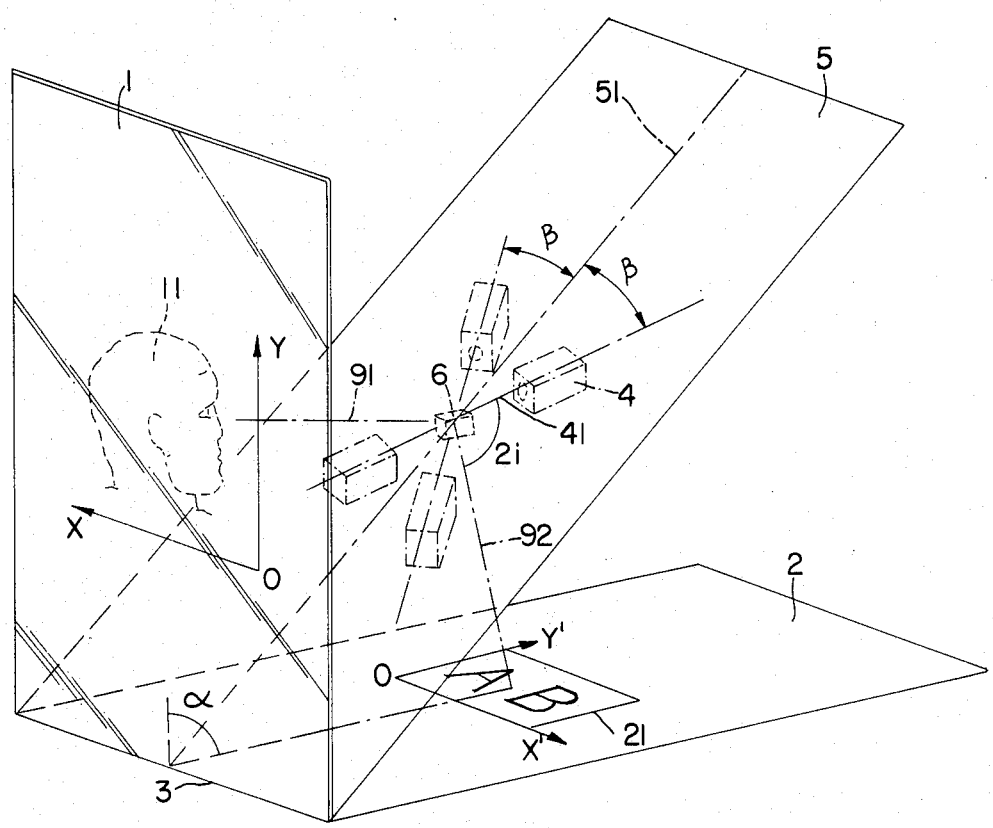
FIG. 2 is a diagram showing various possible relative positions of the optical axis of the objective relative to the sighted objects.

The homologous directions of these objects are marked with reference to the pairs of axes Ox, Oy for 11 and O'x', O'y' for 21 (see FIG. 2). Ox and O'x' are parallel and have opposite directions and the change from Oy to O'y' is made by a rotation around 3.

In the case of an audiovisual device, one subject will be a person and the other subject will be a document placed right side up before him or her so as to permit normal reading. The plane 1 is vertical, the plane 2, which supports the document, being horizontal or slightly inclined.

The reflecting surface of the reflector 6 which is centered on the optical axis 41 forms a constant angle with the latter. The angle of incidence i formed by the optical axis 41 and the normal to the reflecting surface of the mirror is substantially defined by the relationship $$\cos 2i = \pm \sin^2 \frac{\alpha}{2}.$$

The objective and the reflector are positioned so that the optical axis 41 included between this reflector and this objective will be situated in the bisector plane 5 of the dihedron formed by the two object planes 1 and 2 and forms an angle $\beta$ equal to $(\pi - \alpha)/2$ with a straight line 51 normal to the ridge 3 in the bisector plane.

To move from the observation of the object 11 to the object 21, the reflector 6 rotates through an angle of rotation $\gamma$ defined by the relationship $$\tan \frac{\gamma}{2} = \frac{\gamma}{2} = \frac{\lambda}{\sin \frac{\alpha}{2}}.$$

The rotational movement from one observation position to the other may be controlled automatically.

The objects 11 and 21 are placed so that the lines 91 and 92 normal to the center meet substantially at the same point on the reflecting surface of the reflector.

In the case where the distances 91 and 92 between the reflector 6 and the objects are different, the rotation of the reflector is coupled to the focusing of the objective. In this case, the optical axis of the objective is no longer in the bisector plane but in a plane parallel to the bisector plane.

In the case where the object planes 1 and 2 are at 90° from each other, the angle β formed between the optical axis 41 and the straight line 51 is equal to π/4 and the angle of incidence i of the optical axis 41 on the reflector is equal to 60° or 30°. The angle γ through which the reflector should be rotated between the two observation positions is therefore equal to 109.47°.

Referring to FIG. 2, it will be noted that the optical axis assumed to be positioned can occupy one of the four positions shown in this Figure, which are symmetrical, in pairs, relative to the straight line 51, always forming the angle β defined above to the said straight line 51.

The angle of incidence i of the optical axis on the reflector is determined by the direction of the sighting axis. For two positions which are symmetrical relative to 51, the angle of incidence is the same, this angle changing when the direction of sighting is reversed.

In the case where the instrument 4 is a camera and where there is only a single reflection due to the reflector 6, the images provided by the camera are inverted relative to the normal viewfinding. The sweep direction of the camera tube must then be reversed to produce images which are properly upright.

By virtue of the principle of the reversed return of the light, the apparatus could be employed for producing two different projections from a single transparency.

The apparatus makes it possible to change from a first subject to a second subject whatever their arrangement while positioning the images in a specified manner. It is usually possible to find a direction of the camera axis, an angle of incidence and an angle of rotation of the mirror which are suitable.

We claim:

1. In an apparatus provided with an unmoving observation device for alternate scanning of two objects respectively located in two intersecting planes to present on a vertical plane alternately one of two images thereof positioned in the same direction, whereby it is unnecessary to rotate one image, said device comprising a camera with an objective on a mirror rotatable in front of the camera objective, the improvement according to which:

(a) said camera is located in a bisector plane of a dihedron formed by two imaginary half planes corresponding to the planes of said two objects and forming an angle α therewith, the optical axis of said camera being oriented according to an angle β equal to $(\pi - \alpha)/2$ with a straight center line of said bisector plane perpendicular to the ridge of one of the half planes forming said dihedron;

(b) means for rotating said mirror located in front of the camera objective about an optical axis of said camera objective according to an angle γ such as $$\tan \frac{\gamma}{2} = \frac{1}{\sin \frac{\alpha}{2}}$$

in order to reproduce alternately on said screen one of said two objects;

(c) said optical axis being so located that its angle of incidence (i) satisfies with said mirror the equation $$\cos 2i = \pm \sin^2 \frac{\alpha}{2}.$$

2. Improvement according to claim 1, wherein the angle α is equal to π/4.

3. Improvement according to claim 1, wherein the angle β is equal to π/4.

4. Improvement according to claim 1, wherein the angle of incidence (i) is 60°.

5. Improvement according to claim 1, wherein the rotation angle γ of the mirror is 109.47°.

* * * * *